Patented Apr. 29, 1941

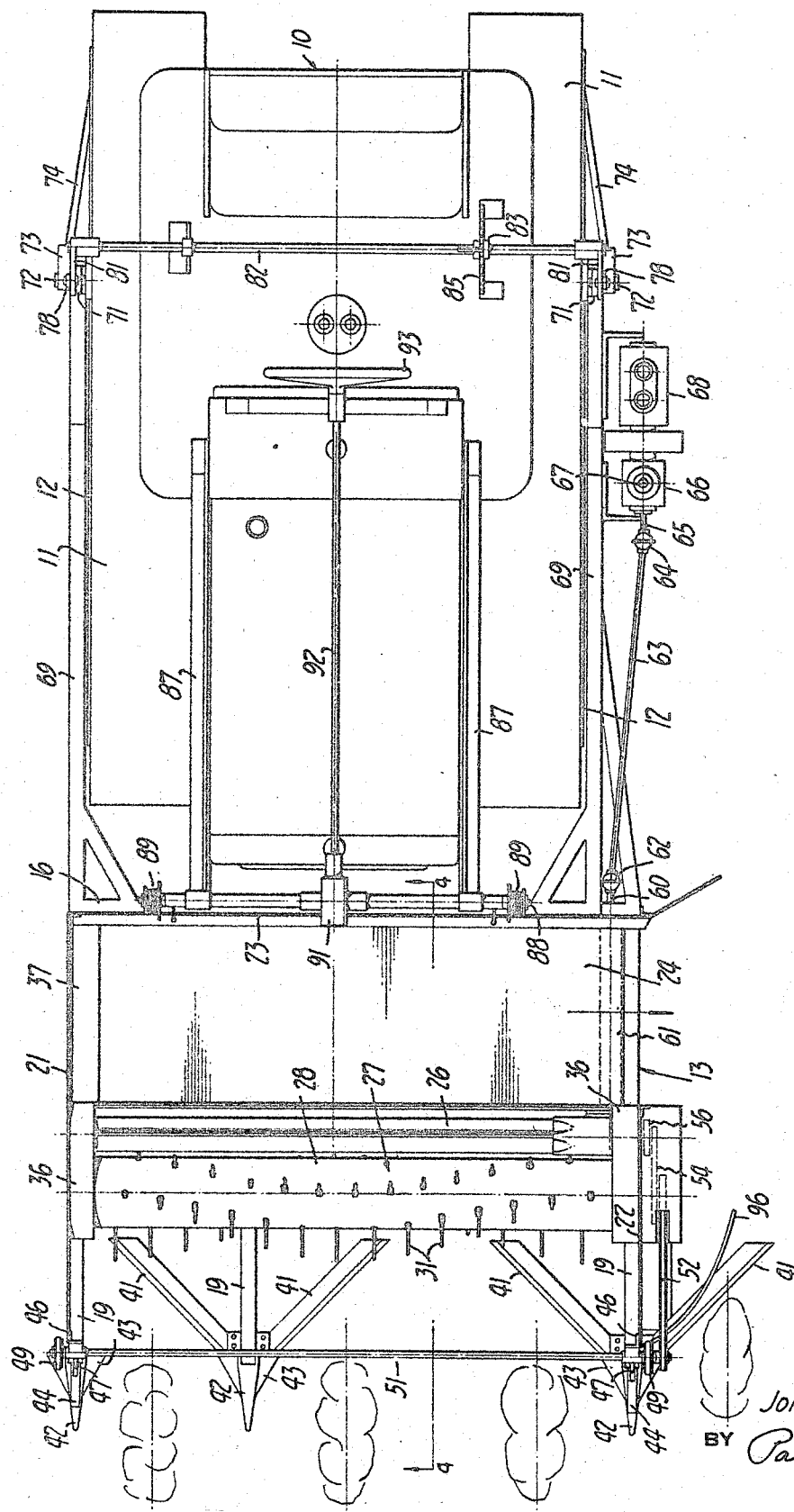

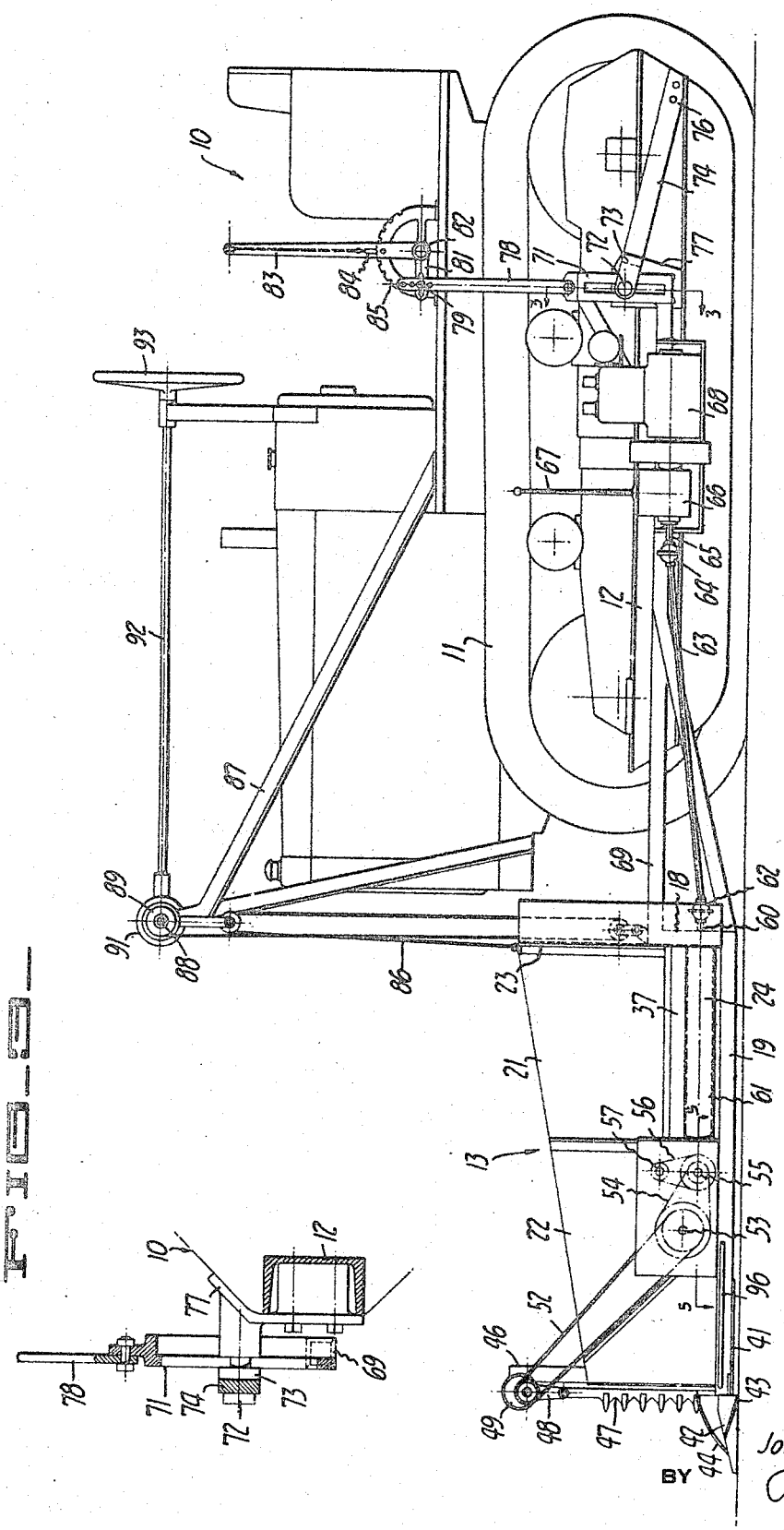

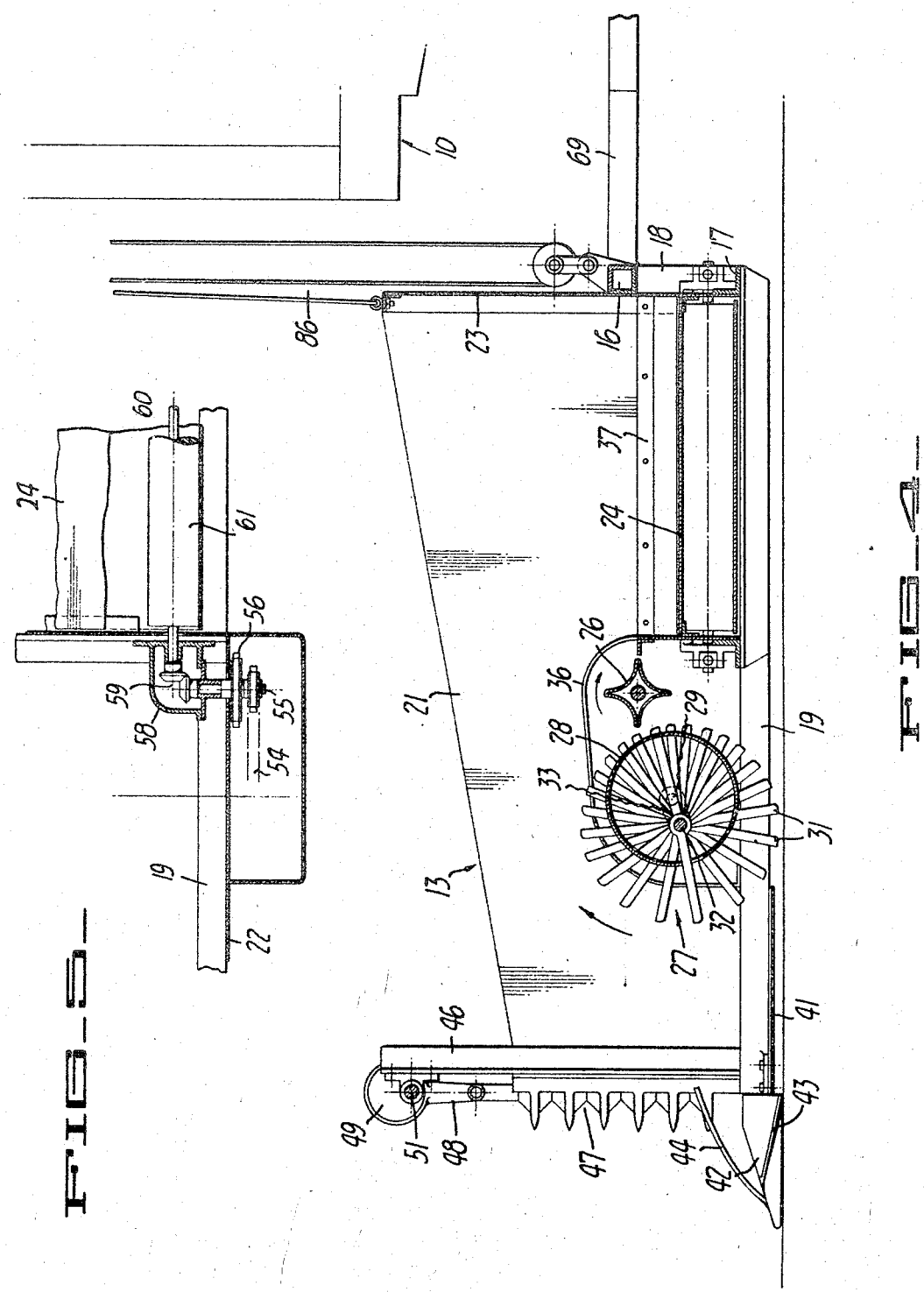

2,240,066

UNITED STATES PATENT OFFICE 2,240,066

BEAN HARVESTER AND WINDROWER

John W. Bingham, Vernalis, Calif., assignor to a copartnership consisting of John W. Bingham, Mrs. Louis C. Minghetti, and Charles F. Rhyno, Vernalis, Calif.

Application October 10, 1939, Serial No. 298,789

12 Claims. (Cl. 56—23)

My invention relates generally to harvesters and windrowers and is concerned more particularly with the provision of improved apparatus of this character which is especially adapted for use in harvesting and windrowing beans or similar vine-like plants.

It is a general object of my invention to provide an efficient harvester and windrower for beans and similar plants whereby a plurality of rows of beans may be cut and placed in one windrow for subsequent threshing operations.

Another object of the invention is to provide an improved method of harvesting and windrowing beans and similar plants.

Other objects of the invention will be apparent from the following description of a preferred embodiment of the invention as illustrated in the accompanying drawings, in which—

Fig. 1 is a plan view of a bean harvester and windrower as attached to a track-type tractor.

Fig. 2 is a side elevation of the apparatus shown in Fig. 1.

Fig. 3 is a detailed sectional view taken in a plane indicated by the line 3—3 in Fig. 2.

Fig. 4 is a longitudinal vertical enlarged sectional view taken in a plane indicated by the line 4—4 in Fig. 1.

Fig. 5 is a fragmentary horizontal enlarged sectional view through a part of a drive mechanism and is taken in a plane indicated by the line 5—5 in Fig. 2.

Referring to the drawings, 10 indicates a conventional form of track-type tractor having tracks 11 mounted on the track frames 12 in the usual manner. At the front of the tractor the harvesting and windrowing unit 13 is mounted in a manner later described.

The harvesting and windrowing unit includes a frame comprising vertically spaced rear transverse beams 16 and 17 which are suitably connected by vertical standards 18 at each end. From the lower beam 17 three longitudinally extending runners 19 are provided, the two righthand runners 19 as viewed from the tractor being spaced apart to receive one row of plants therebetween while the two lefthand runners 19 are spaced apart to receive two rows therebetween as indicated in Fig. 1. The various frame portions may be connected as by welding.

The harvesting unit is provided with respective side walls 21 and 22 extending upwardly from the outside runners or frame members 19 and by rear wall 23 joined to the rearward end of righthand side wall 21 and suitably secured to the transverse beams 16 and 17. Immediately adjacent rear wall 23, there is mounted a transversely extending draper 24 to which material is fed from a pick-up unit including booster roll 26 and eccentric pick-up unit 27 of conventional construction. The booster roll 26 not only aids in feeding the vines but also provides an agitation thereof to facilitate removal of clods and stones. Generally the pick-up unit 27 comprises a shell or cylinder 28 suitably journalled at its ends by stubshafts 29 and slotted to receive spirally arranged pick-up fingers 31 which are journalled on an eccentrically disposed shaft 32. Shaft 32 is mounted by arms 33 on the stubshafts 29 to provide for adjustment of its eccentricity and correspondingly the pick-up region of the fingers. The ends of pick-up unit 27 and roll 26 are covered by guards 36, and the ascending end of draper 24 is protected by guard 37.

To cut the plants for pick-up by the unit 27 V-shaped knife means 41 are secured adjacent the ends of the two lefthand runners 19, being detachably mounted thereon in a convenient manner for removal for sharpening. For example, suitable bolts may be used for securing the knives in place. The arrangement is such that each set of knives 41 will cut two rows of plants.

To provide for pick-up of the plants from the ground prior to cutting, a plurality of inclined pick-up shoes 42 are provided, one end of each shoe 42 being secured as by welding to the associated runner 19. The shoes 42 engage in the adjacent furrows ahead of the runners 19 and serve to lift the vines for free engagement of the cutting knives 41 with the stems of the vine. To prevent the shoes 42 from entering the ground inclined side flanges or runners 43 project outwardly therefrom. Also guide bars 44 extend upwardly and rearwardly from shoes to lift tangled vines for cutting apart as will now be described.

To provide for separation of any tangled vines between adjacent rows the front edge of each of side walls 21 and 22 is provided with a vertical standard 46 on which vertically disposed sickle-type knife means 47 are mounted. Knives 47 are operated by arms 48 having an eccentric mounting on disc 49 mounted at either end of a transverse shaft 51 suitably journaled on the standards 46. The lefthand end of shaft 51 is connected by suitable chain and sprocket means 52 with drive shaft 53 for cylinder 28 of pickup unit 27. The shaft 53 is connected by suitable chain and sprocket means 54 with shaft 55 which is also connected by chain and sprocket means 56 with drive shaft 57 for booster roll 26.

Shaft 55 (Fig. 5) is suitably journalled in gear housing 58 and has a bevel gear connection 59 with shaft 60 of driving roller 61 for draper 24. At its rearward end shaft 60 (Fig. 2) has a universal connection 62 with shaft 63 extending rearwardly and having a universal connection 64 with driven shaft 65 of a transmission unit 66 having a control lever 67. The transmission unit 66 is suitably driven from a motor 68 mounted on rearwardly extending push-bar 69 of the harvester and windrower frame. If desired, the transmission 66 may be driven from the power take-off unit of the tractor.

The windrower and harvester unit is mounted for movement to and from operative harvesting positions, and is also provided with an adjustment for vertical positioning with respect to the ground, so that it just clears the tops of the furrows during operation and at the same time cuts the plants as close to the ground as is possible. As seen in Figs. 1 and 2 the opposite push-bars 69 of the frame extend rearwardly from upper beam 16 and at their rearward ends are provided with vertically disposed slotted extensions 71. The slot in each extension 71 is engaged by a transverse bolt 72 (Figs. 2 and 3) extending between the forked end 73 of a mounting bracket 74 which is detachably secured at 76 and 77 to the associated track frame 12. Each extension 71 (Fig. 2) is pivotally connected to an upwardly extending link 78 pivotally connected by bolt 79 with an arm 81 carried by a transverse adjusting shaft 82. Shaft 82 also carries adjusting lever 83 having a locking pin 84 for cooperation with an arcuate notched rack 85. As seen in Fig. 2 both link 78 and arm 81 have a series of holes to receive bolt 79 and thereby enable an initial adjustment of the rear end of the push-bars 69 and thereby the front end of the unit.

Adjacent the rear end of the harvester and windrower frame a vertical adjustable support is provided therefor by respective pulley systems 86 (Figs. 1 and 2) extending between the harvester and windrower frame and spaced apart bracket means 87, suitably mounted on the power plant of the tractor. At their upper ends bracket means 87 carry transverse shaft 88 carrying the winding reels 89 for the respective pulley systems. Intermediate its ends shaft 88 has a worm and worm gear connection indicated generally at 91 with an adjusting shaft 92 extending rearwardly to the operator's station and provided with an adjusting wheel 93.

By operating wheel 93 the tractor and windrower harvester operator can raise and lower the windrower and harvester unit to and from operative positions. Also by adjustment of the hand lever 83 the harvester and windrower unit can be rocked about its support by the pulley system supporting means to raise and lower the front end of the unit in acccordance with the ground conditions being worked.

In operation the four knives 41 are adapted to cut four adjacent rows of vines, one of which lies outside the side walls 21 and 22. The vines cut by the outside knife 41 are moved sidewise by the inclined guard 96 extending outwardly from lefthand runner 19. The three rows cut by the knives between the walls 21 and 22 are engaged by the pick-up unit 27 and lifted rearwardly and over the booster roll 26 onto the draper 24. As indicated by the arrow, the draper 24 operates with its upper stretch moving to eject material therefrom to the left so that the three rows lifted by the pick-up unit and moved onto the draper 24 are discharged outwardly on top of the row cut by the outside knife 41. In this manner during one traverse of the length of a field, four rows can be cut and piled into a windrow, and by turning the tractor to the left at the end of the rows the next four adjacent rows can also be cut and moved into the same windrow in the manner described. In this manner an eight row windrow can be formed for subsequent pick-up by a threshing machine. The harvester-windrower not only provides for efficient cutting and windrowing with a minimized loss of pods, but also delivers the vines into the windrow in a fluffy untangled condition which facilitates drying for the threshing operation.

I claim:

1. A bean harvester and windrower comprising a transversely extending draper for conveying material as it is received for discharge at one side of the machine to form a windrow, a rotary pick-up unit mounted in front of said draper to pick up and direct material thereto, and a plurality of cutting blades in front of said pick-up unit for cutting off plants adjacent the ground.

2. A bean harvester and windrower comprising a transversely extending draper for conveying material as it is received for discharge at one side of the machine to form a windrow, a rotary pick-up unit mounted in front of said draper to pick up and direct material thereto, said pick-up unit including a rotary shell and pick-up fingers extending therethrough, said pick-up unit also including means for causing said pick-up fingers to alternately recede and project through said shell, and a plurality of cutting blades in front of said pick-up unit for cutting off plants adjacent the ground.

3. A bean harvester and windrower comprising a transversely extending draper for conveying material as it is received for discharge at one side of the machine to form a windrow, a rotary pick-up unit mounted in front of said draper to pick up and direct material thereto, and a plurality of cutting blades in front of said pick-up unit for cutting off plants adjacent the ground, at least one of said blades being laterally disposed out of the path of said pick-up unit and in line with the discharge from said draper.

4. A bean harvester and windrower comprising a transversely extending draper for conveying material as it is received for discharge at one side of the machine to form a windrow, a rotary pick-up unit mounted in front of said draper to pick up and direct material thereto, a plurality of horizontally disposed V-shaped cutters in front of said pick-up unit, and a pick-up shoe at the apex of each cutter.

5. A bean harvester and windrower comprising a transversely extending draper for conveying material as it is received for discharge at one side of the machine to form a windrow, a rotary pick-up unit mounted in front of said draper to pick up and direct material thereto, and a plurality of horizontally disposed V-shaped cutters in front of said pick-up unit.

6. A bean harvester and windrower comprising a transversely extending draper for conveying material as it is received for discharge at one side of the machine to form a windrow, a rotary pick-up unit mounted in front of said draper to pick up and direct material thereto, plant-confining vertically disposed side walls at either side of said pick-up unit and said draper, and a plurality of cutting blades in front of said pick-up unit, at least one of said blades being disposed on the outer side of one of said side walls.

7. A bean harvester and windrower comprising a transversely extending draper for conveying material as it is received for discharge at one side of the machine to form a windrow, a rotary pick-up unit mounted in front of said draper to pick up and direct material thereto, plant-confining vertically disposed side walls at either side of said pick-up unit and said draper, and a plurality of cutting blades in front of said pick-up unit, at least one of said blades being disposed on the outer side of one of said side walls, and vertically disposed cutters at the front edges of said side walls.

8. Bean harvesting and windrowing equipment for mounting on a track-type tractor, comprising a frame, a transversely extending draper on said frame, a rotary pick-up unit mounted on said frame in front of said draper, cutting knives in said frame in front of said pick-up unit, push bars extending rearwardly from said frame for connection to the respective track frames of the tractor, and adjustable connections for said push bars and said tractor frames to vary the vertical position of said frame relative to the ground.

9. Bean harvesting and windrowing equipment for mounting on a track-type tractor, comprising a frame, a transversely extending draper on said frame, a rotary pick-up unit mounted on said frame in front of said draper, cutting knives in said frame in front of said pick-up unit, push bars extending rearwardly from said frame for connection to the respective track frames of the tractor, means connected to said frame adjacent the rearward portion thereof to support said frame on the tractor for vertical movement to and from operative position, and adjusting means connected to the rear ends of said push bars for further varying the vertical position of said frame relative to the ground.

10. Bean harvesting and windrowing equipment for mounting on a track-type tractor, comprising a frame, a transversely extending draper on said frame, a rotary pick-up unit mounted on said frame in front of said draper, cutting knives in said frame in front of said pick-up unit, push bars extending rearwardly from said frame for connection to the respective track frames of the tractor, vertically slotted extensions on said push bars, push bolts on said track frames engaging the slots of said extensions, and adjusting means including links extending upwardly from said extensions for raising and lowering the rear ends of said push bars and thereby lower and raise the front end of said frame to adjust said knives with respect to the ground.

11. A bean harvester and windrower comprising a transversely extending draper for conveying material as it is received for discharge at one side of the machine, a rotary pick-up unit mounted in front of said draper to pick up and direct material thereto, a plurality of stationary blade cutters in front of said pick-up unit, and plant-confining side walls at either side of said pick-up unit and said draper, one of said side walls being cut-away at the discharge end of said draper to provide for discharge of plants from said draper into a windrow.

12. A bean harvester and windrower comprising a transversely extending draper for conveying material as it is received for discharge at one side of the machine, a rotary pick-up unit mounted in front of said draper to pick up and divert material thereto, a plurality of V-shaped stationary blade cutters in front of said pick-up unit, plant-confining side walls at either side of said pick-up unit and said draper, one of said side walls being cut-away at the discharge end of said draper to provide for discharge of plants from said draper into a windrow, and an inclined pick-up shoe at the apex of each of said cutters for lifting vines into position for engagement by said cutters.

JOHN W. BINGHAM.